US008048572B2

(12) United States Patent
    Gerber

(10) Patent No.: US 8,048,572 B2
(45) Date of Patent: Nov. 1, 2011

(54) LONG LIFE LEAD ACID BATTERY HAVING TITANIUM CORE GRIDS AND METHOD OF THEIR PRODUCTION

(76) Inventor: Eliot Samuel Gerber, Moraga, CA (US)

( * ) Notice: Subject to any disclaimer, the term of this patent is extended or adjusted under 35 U.S.C. 154(b) by 0 days.

(21) Appl. No.: 12/799,734

(22) Filed: May 3, 2010

(65) Prior Publication Data
    US 2011/0033744 A1    Feb. 10, 2011

Related U.S. Application Data

(63) Continuation-in-part of application No. 12/313,090, filed on Nov. 17, 2008, now Pat. No. 7,732,098, which is a continuation-in-part of application No. 12/218,154, filed on Jul. 11, 2008, now abandoned.

(51) Int. Cl.
    *H01M 4/68*    (2006.01)
    *H01M 4/74*    (2006.01)
    *H01M 4/82*    (2006.01)
(52) U.S. Cl. .............. 429/242; 429/245; 29/2; 205/263; 205/271
(58) Field of Classification Search ................... 429/242, 429/245; 29/2, 623.5; 205/263, 271
    See application file for complete search history.

(56) References Cited

U.S. PATENT DOCUMENTS

| | | | |
|---|---|---|---|
| 2,713,079 A | 7/1955 | Carrick et al. | |
| 2,739,997 A | 3/1956 | Carrick et al. | |
| 3,486,940 A * | 12/1969 | Ruben | |
| 3,798,070 A * | 3/1974 | Ruben | |
| 3,870,563 A * | 3/1975 | Ruben | |
| 4,136,235 A * | 1/1979 | de Nora et al. | 429/245 X |
| 4,326,017 A * | 4/1982 | Will | |
| 4,554,228 A | 11/1985 | Kiessling | |
| 4,666,666 A | 5/1987 | Taki et al. | |
| 4,683,648 A | 8/1987 | Yeh | |
| 4,760,001 A | 7/1988 | Nann et al. | |
| RE33,133 E | 12/1989 | Kiessling | |
| 5,223,354 A | 6/1993 | Senoo et al. | |
| 5,238,647 A | 8/1993 | Mitsuyoshi et al. | |
| 5,339,873 A | 8/1994 | Feldstein | |

(Continued)

FOREIGN PATENT DOCUMENTS

JP    10-154517    *    6/1988

OTHER PUBLICATIONS

U.S. Appl. No. 11/048,104, filed Feb. 2, 2005, Jung et al.

(Continued)

*Primary Examiner* — Stephen J. Kalafut

(57) ABSTRACT

A lead acid electric storage battery uses conventional lead-acid secondary battery chemistry. The battery may be a sealed battery, an unsealed battery or a conventional multi-cellbattery. It has 12 to 25 cells in a single case. The case is less than 12 inches long and may be less than 6 inches long. The battery has a set of positive battery grids (plates) which are constructed with a core of thin titanium expanded metal having a thickness preferably, for start batteries etc. in the range 0.1 mm to 0.7 mm and most preferably 0.2 mm to 0.4 mm. The grid cores are of a titanium alloy containing a platinum group metal. The cores are coated with hot melt dip lead and are not lead electroplated. The grid cores expand and contract, with temperature changes, much less than conventional lead grids.

15 Claims, 4 Drawing Sheets

U.S. PATENT DOCUMENTS

| | | | |
|---|---|---|---|
| 5,379,502 A | | 1/1995 | Feldstein |
| 5,411,821 A | | 5/1995 | Feldstein |
| 5,544,681 A | * | 8/1996 | Feldstein .................. 429/245 X |
| 5,652,074 A | * | 7/1997 | Larson et al. ................. 429/242 |
| 6,316,148 B1 | | 11/2001 | Bhardwaj |
| 6,334,913 B1 | | 1/2002 | Yashiki et al. |
| 6,447,954 B1 | * | 9/2002 | Timmons et al. ............... 29/2 X |
| 6,979,513 B2 | | 12/2005 | Kelley et al. |
| 7,033,703 B2 | | 4/2006 | Kelley et al. |
| 7,732,098 B2 | * | 6/2010 | Gerber ........................... 429/242 |
| 2004/0151957 A1 | | 8/2004 | Brooks et al. |
| 2004/0151982 A1 | * | 8/2004 | Shivashankar et al. |
| 2006/0292448 A1 | | 12/2006 | Gyenge et al. |
| 2007/0141468 A1 | | 6/2007 | Barker |

OTHER PUBLICATIONS

U.S. Appl. No. 11/279,103, filed Apr. 8, 2006, Jung et al.
Dai "Lead-plated titanium grids etc." 41 Power Sources Conference, Jun. 14-17, 2004.
Dai al. "Corrosion of lead Plate Titanium etc" ( ref.on Google).
Kurisawa "Development of Positive Electrodes with fin Oxide Coating by Applying a Sputtering Technique for Lead Acid Batteries." Journal Power Sources 1995 (2001) 1-5, 1-9.

* cited by examiner

LONG LIFE LEAD ACID BATTERY HAVING TITANIUM CORE GRIDS AND METHOD OF THEIR PRODUCTION

RELATED UNITED STATES PATENT APPLICATIONS

The present patent application is a continuation-in-part application partly based upon the applicant's prior United States patent applications as follows: application Ser. No. 12/313,090 (20100092630) filed Nov. 17, 2008 now U.S. Pat. No. 7,732,098 and entitled "Lead acid battery having ultra-thin titanium grids" and application Ser. No. 12/218,154 filed Jul. 11, 2008 (now abandoned)

FIELD OF THE INVENTION

The present invention relates to lead acid storage batteries, and more especially to the cells for such batteries.

BACKGROUND OF THE INVENTION

The need for improvements in lead-acid storage batteries is widely recognized.

Hundreds of articles, patents and research projects have been directed toward improving such batteries. Some of the important characteristics that still need improvement are mechanical ruggedness, long life and multiple cycles (charge-discharge).

It is generally believed that automobile batteries have a lifetime of 3, or at most 6, years and that to have longer life they should have thicker lead positive grids. In contrast, the present invention intends to provide a 10 year lifetime battery using thinner grids.

ADAC 2008 for the year 2007 states "The battery remains a weak link . . . breakdowns on 1.95 million vehicles six years or less are as follows: 52% battery . . . breakdown due to the battery remains the number one cause."

According to "Wikipedia" "Because of vibration, shock, heat, cold, and sulfation of their lead plates, few automotive batteries last beyond six years of regular use. Automotive starting batteries have many thin plates to provide as much current as possible in a reasonably small package. In general, the thicker the plates, the longer the life of the battery. Positive grid corrosion ranks among the top 3 reasons for battery failure. According to Solarnavigation "Plate thickness (of the positive (+) plate) matters . . . so the thickest plates will last the longest"

It has been suggested that the power or lifetime of lead acid batteries may be increased by substituting lead plates (grids) with other materials. However, it is believed that almost all commercially available lead acid batteries use lead plates. There are now a number of projects that have been reported to use non-metal battery plates. Firefly Energy has announced it is developing carbon foam plates, see U.S. Pat. Nos. 6,979,513 and 7,033,703. Also, Jung et al have filed patent applications on carbon battery plates, see U.S. application Ser. Nos. 11/048,104 and 11/279,103 (both now abandoned).

One suggestion is to use lead electroplating on a core of another metal, such as aluminum, copper, steel or titanium. Some of the prior patents and articles about lead-plated cores, or otherwise relevant, are set forth below. All of these patents and articles, and all others cited in this patent application, are included herein by reference. A series of patents to Rubin uses expanded titanium or titanium alloy positive grids without a lead coating. In U.S. Pat. No. 3,486,940 Rubin discloses a titanium nitride core with a gold covering layer; in U.S. Pat. No. 3,615,831 he discloses a similar gold covering layer over a titanium-molybdenum-zirconium alloy core and in U.S. Pat. No. 4,251,608 he discloses a steel or titanium core with a graphite protective coating. See also Rubin U.S. Pat. Nos. 3,798,070 and 3,870,563 and Will U.S. Pat. No. 4,326,017.

Lead is plated on copper in Senoo U.S. Pat. No. 5,223,354; Senoo U.S. Pat. No. 5,093,970; Nann U.S. Pat. No. 4,760,001 and Kiessling U.S. Pat. No. 4,554,228 and Re: 33,133. U.S. Pat. No. 4,683,648 to Yeh shows a titanium core electroplated with lead. U.S. Pat. Nos. 5,379,502; 5,339,873; 5,544,681 and 5,411,821 disclose copper or steel or other materials as cores with titanium and lead layers. U.S. Pat. No. 6,316,148 to Bhardwaj discloses a battery using aluminum foil which is coated with lead. U.S. Pat. Nos. 2,739,997 and 2,713,079 to Carrick disclose aluminum plates electroplated with lead in an aqueous plating bath.

The following articles may be considered relevant: Dai et al. "Lead-plated titanium grids etc." 41 Power Sources Conference, Jun. 14-17 (2004); Dai et al. "Corrosion of Lead Plate Titanium etc" (ref. Google); Kurisawa "Development of Positive Electrodes with Tin Oxide Coating by Applying a Sputtering Technique for Lead Acid Batteries." Journal Power Sources 1995 (2001) 1-5, 1-9.

SUMMARY OF THE INVENTION

The present invention relates primarily to lead acid storage batteries. It is the theory of the present invention that the lifetime of positive grids may be extended using a titanium-paladium/ruthanium alloy so they are corrosion resistant.

The difference in temperature under an automobile hood, over a 24 hour period may exceed over 100 degrees F., for example during the summer in the desert. The contraction and expansion of lead battery grids may cause flaking and non-adherence of the battery paste and corrosion of the grids. In the present invention the grids are thinner, so they have less bulk expansion/contraction and they are made of titanium, which has a much lower coefficient of expansion with temperature, compared to lead. The thermal expansion of titanium at 25 degrees C is 8.6 micrometer-1 K-1 and that of lead is about 3 times greater. The typical thickness of the titanium grids of the present invention are 0.4 mm and the thickness of a typical lead grid is 1.2 mm, three times the thickness of the titanium grids. Consequently the bulk difference in thermal expansion is that lead grids expand and contract about six times as much as the titanium grids.

In accordance with the present invention positive plates for lead acid storage batteries, either conventional sealed and unsealed lead acid batteries, consist of thin grids having thin titanium core grids. By thin grids is meant that the grid (plate) is stiff enough to be self-supporting, e.g. it supports itself if stood on one edge, as distinct from thin foil which is thinner and is not self-supporting. The thickness of the titanium core, for starter, electric car and hybrid car batteries, is 0.1 mm to 0.7 mm, preferably 0.2 mm to 0.4 mm, most preferably 0.3 mm to 0.4 mm and in any event, less than 0.7 mm. For deep discharge batteries the titanium core thickness is preferably 0.4 mm to 2.0 mm and more preferably 0.5 mm to 0.8 mm.

The core is formed using expanded metal technology. The titanium core is an alloy containing palladium or/and ruthenium. It is cleaned and then preferably electroplated with a flash coating (0.5 to 5 microns) of silver or nickel, most preferably silver. Preferably the cores are formed from a titanium alloy containing less than 0.9 palladium and/or ruthenium. Most preferably the alloy contains 0.02% to 0.2% palladium. The titanium cores are coated with a hot melt lead coating (not electroplated). Preferably the finished grids are about 0.4 to 0.6 mm thick and may be processed by automated battery paste filling machines. They are the positive grids of the battery. The negative grids are conventional lead grids or may be thin grids of expanded copper alloy, most preferably a cupro-nickel alloy coated with a hot melt lead coating.

DETAILED DESCRIPTION OF THE INVENTION

Figure 1:
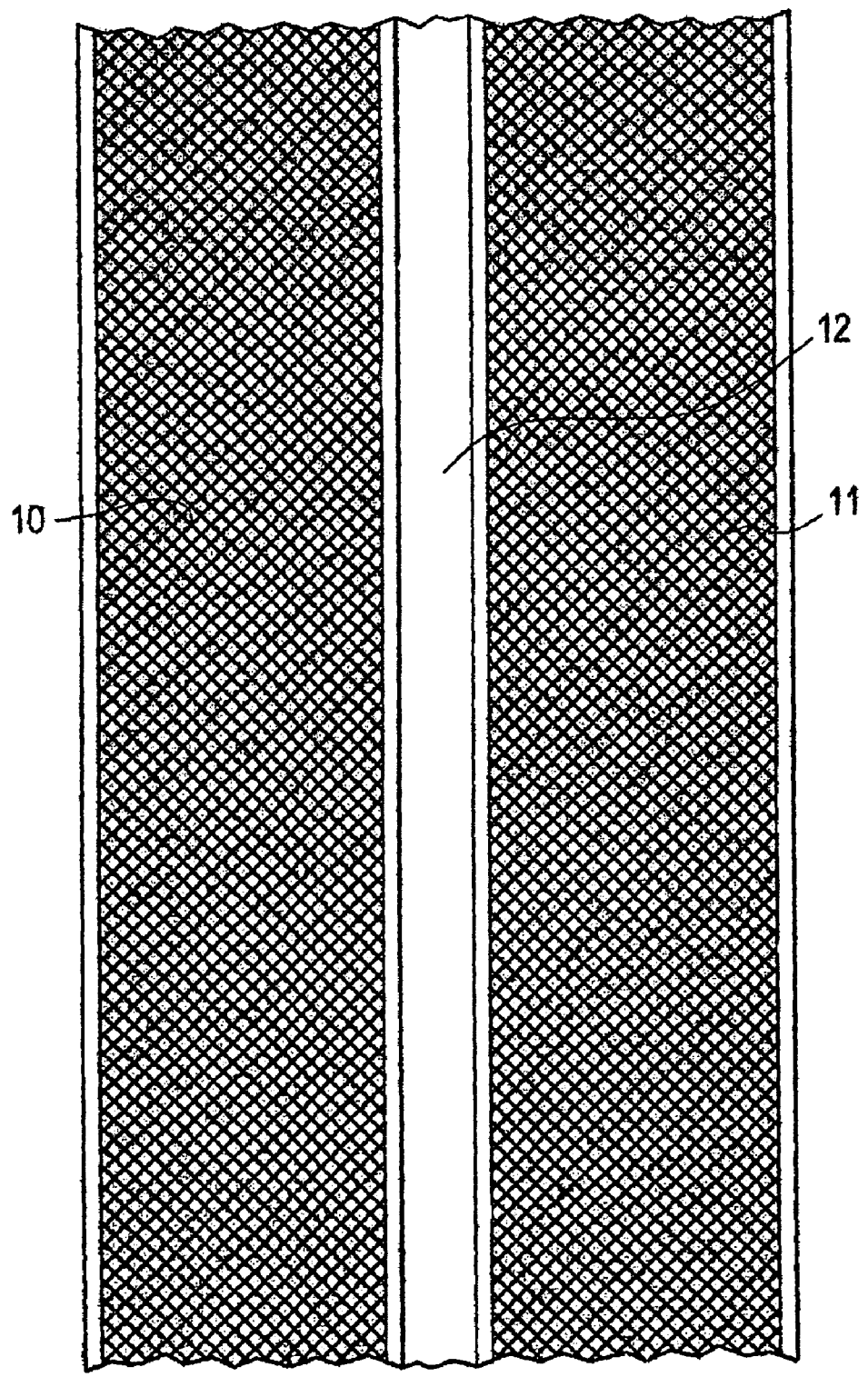
FIG. 1 is a top plan view of a web of grid cores as they come out of the expander machine (before they are separated)

The grid 9 of FIGS. 1-5 is formed from a titanium thin sheet (thin coil). Its thickness, for starter batteries or auto batteries for electric and hybrid cars, is in the preferred range of 01 mm to 0.7 mm and most preferably 0.2 mm to 0.4 mm and in any event, less than 0.7 mm. Most preferably the thickness of the core is about 0.3-04 mm for those batteries.

However, for deep discharge batteries, thicker grids are preferably used, although not as thick as the lead grids used for deep discharge batteries. For deep discharge batteries the thickness of the titanium or copper cores are preferably 0.4 mm to 2.0 mm and more preferably 0.5 mm to 0.8 mm.

Titanium has good electrical conductivity compared to lead; it is stronger than lead; it is lighter than lead; however it may not be completely corrosion resistant to the dilute sulfuric acid ("battery acid") used in lead acid batteries. "Expanded" means perforated and expanded metal.

In the preferred grid core 9, the frame (solid and not expanded metal) has a top bar 12b, 12c and a bottom bar 12a, 12d and a lug 13.
There is no frame at the sides. The frame is of the same material and thickness as the expanded metal body portion. The preferred dimensions are as follows: top bar and the bottom bar are 4 mm high (0.157 in.) The lug is 15.875 mm wide (⅝th inch) and 25.4 mm high (1 inch) (above the top bar). The expanded metal body is not flattened. The metal body is 142.875 mm wide (5 and ⅝th inch) and 120.65 mm high (4 and ¾th inch) including the 4 mm top bar and bottom bars. The lug has a 4 mm gap from the edge of the body.

All of the grid cores are the same size and shape and thickness. All of them are made with an expanded metal body. Preferably the expanded metal body has a diamond pattern and is not flattened: LWD (long width diamond) 12 mm/SWD (short width diamond) 7 mm; the preferred width of strand 1 mm; thickness of piece (grid) after expansion 0.35 mm The grids are preferably formed from a titanium alloy containing between 0.9% and 0.009% of either ruthenium or palladium or both ruthenium and palladium and may contain molybdenum 5-20%. The preferred range, in the titanium alloy, is 0.2% to 0.01% of palladium or ruthenium or both, most preferably 0.2% to 0.02%. The titanium grids, after forming and cleaning may be coated with a protective coating. The preferred coatings are tin oxide and/or a flash electroplating or PVC coating of 0.05-10 microns thick silver, preferably 1.0 to 5 microns thick silver. Less preferred is a flash electroplating or PVC coating of 1.0 to 10 microns of nickel.

In one embodiment of the present invention the positive grids have titanium cores and the negative grids have copper cores.

The cleaning procedure is to soak the grid cores, while in the form shown in FIG. 1, in the following sequence of liquids:

1. acetone or acetal acetate, 2. water and detergent with ultrasonic, 3. tap water with ultrasonic, 4. deiionized water with ultrasonic, 5. distilled water with ultrasonic, and 6. isopropal alcohol.

The lead used to coat the titanium and copper cores preferably does not include materials used to strengthen, harden, or stiffen lead grids in conventional lead-acid batteries. Such strengthening, hardening and stiffening materials include antimony and calcium (0.1-20%). They are not necessary as the titanium or copper cores provide the required strength and stiffness. Preferably the lead alloy is antimony free. Preferably the lead includes alloying metals which aid in reducing corrosion, such alloying metals including tin, cobalt, and a small amount of calcium (0.03-0.05%).

Figure 2:
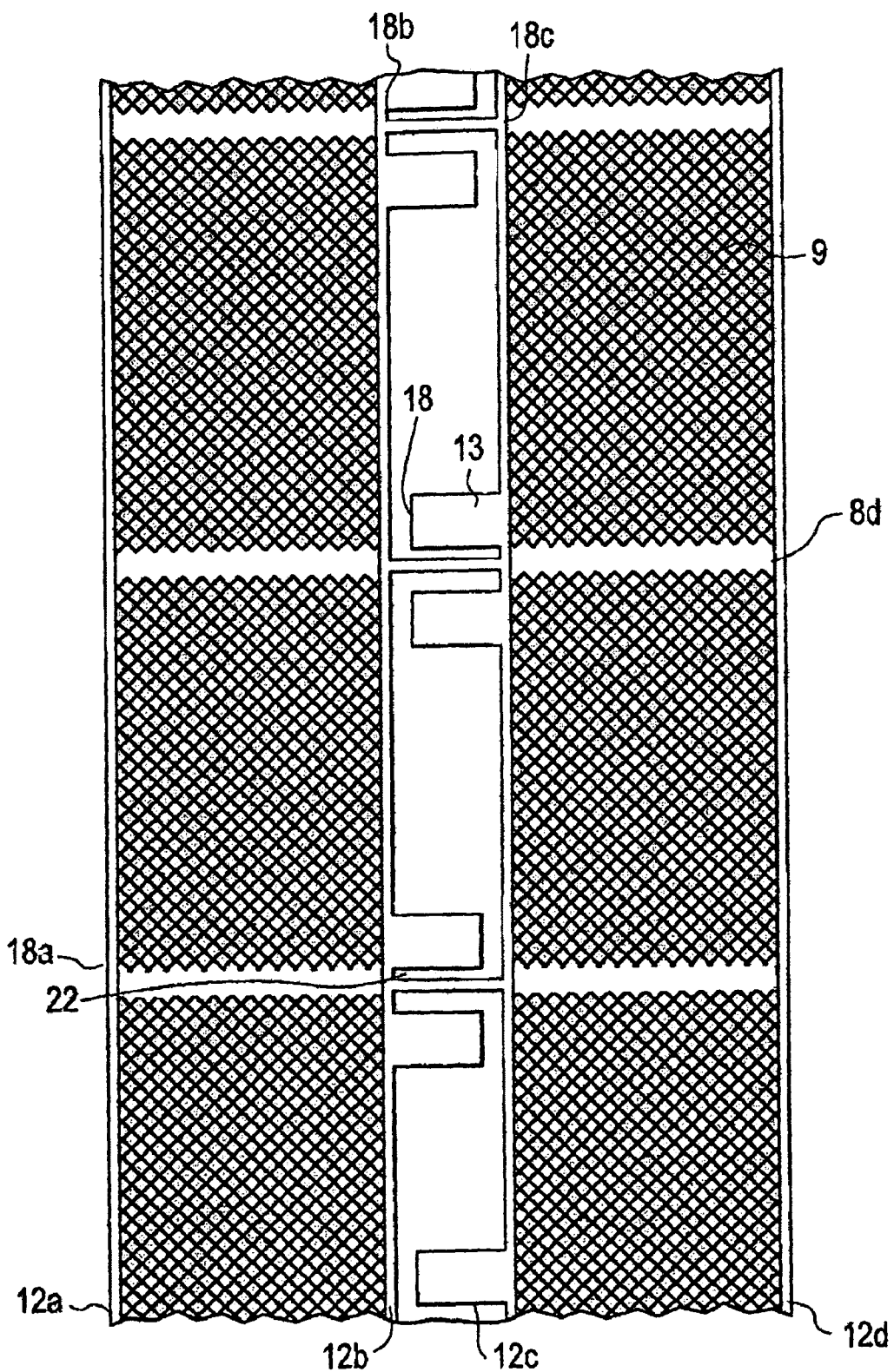
FIG. 2 is a top plan view of two joined webs of grid cores after they are stamped and as they enter the processing tanks and before they are separatred to become the individual grids of FIG. 3.

As shown in FIGS. 1-2 the copper or titanium core grids are formed in a metal expander machine between rollers to form a flat sheet of expanded metal (unflattened). As shown in FIG. 2, the grids are stamped but are not separated at the connection wings 12a-12d. The connected, expanded and stamped web is processed in hot lead coating machine such as a hot air solder leveler using heated air knives. The lead coating thickness, on each side, is preferably 50 to microns and most preferably about 125 to 175 microns. Lead is not applied by electroplating, as in many prior art disclosures As shown in FIGS. 1-5 the copper and titanium expanded metal grid body portions 9 are formed from web strips 10, 11 with a solid (unexpanded) top bar 12a,12c and a solid bottom bar (strips) 12a, 12d which are 4 mm. in width. After the web is cleaned and coated, the lugs 13 are cut at their top edge 16. The raw edge 16 of the lug, after cutting and assembly in a battery, are within a lead bar and need not be protected from corrosion.

However, the small edges 17 of the wings 18a,18b,18c and 18d may be corrosion protected, for example by being coated with non-conductive fluoropolymer paint, lead or tin.

The preferred size of the grids (not including the wings 18a-18d) is 4¾ inches high and 5⅝ inches wide. The bars, which are included in the height dimension, are 4 mm high. The wings 18a-18d are each 6 mm long. The cross-sections of the wings are all the same and is preferably 12 mm square (4 mm high and 3 mm thick). This cross-section in titanium should provide about 1700 pounds ultimate tensile strengh. The two wings, on each side of a grid, provides 3400 pounds ultimate tensile strength, which should be sufficient to progress the web through the various tanks. In contrast, if the wings were made of lead their tensile strength would be less than ⅕ that of titanium wings.

Figure 3:
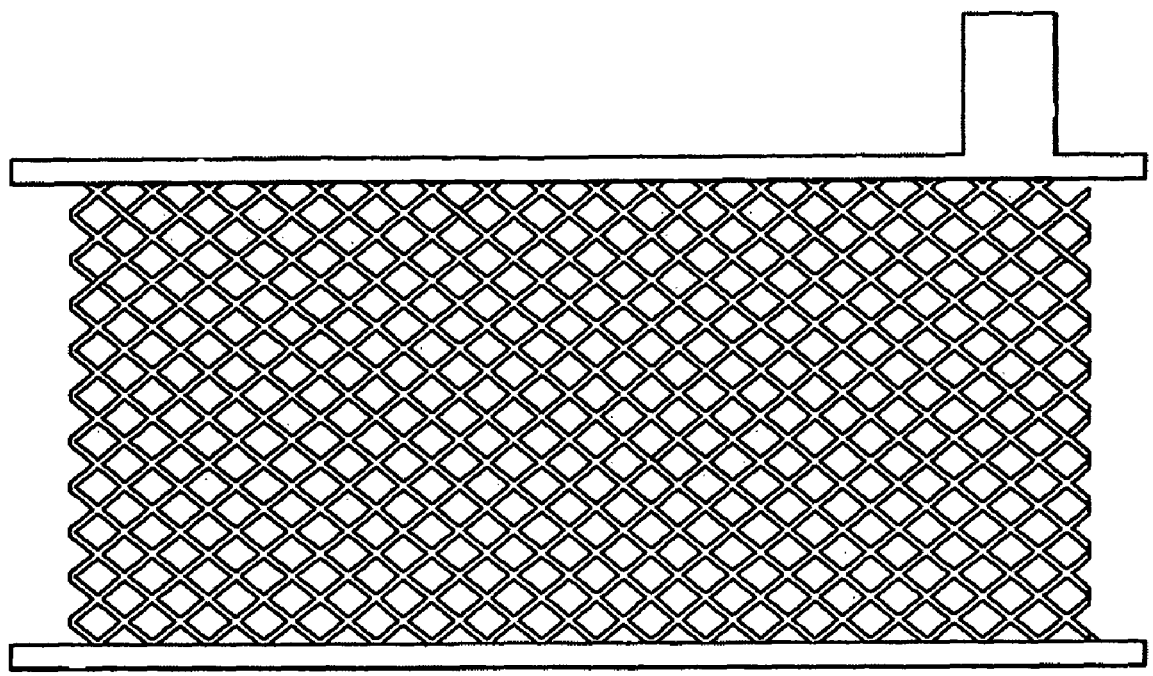
FIG. 3 is a top plan view of a finished grid of the present invention.
Figure 4:
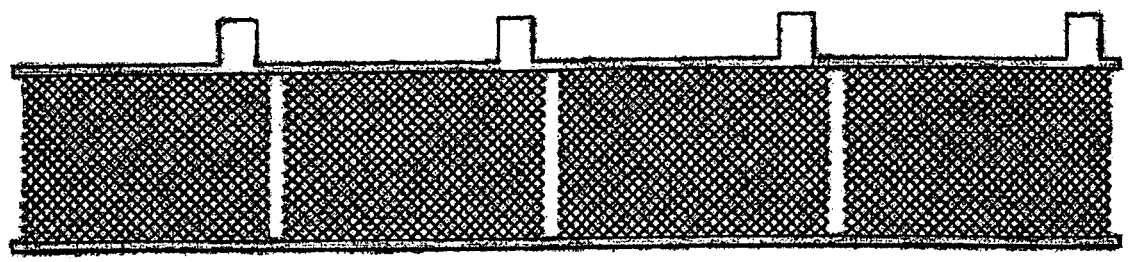
FIG. 4 is a single elongated web of joined grid cores.
Figure 5:
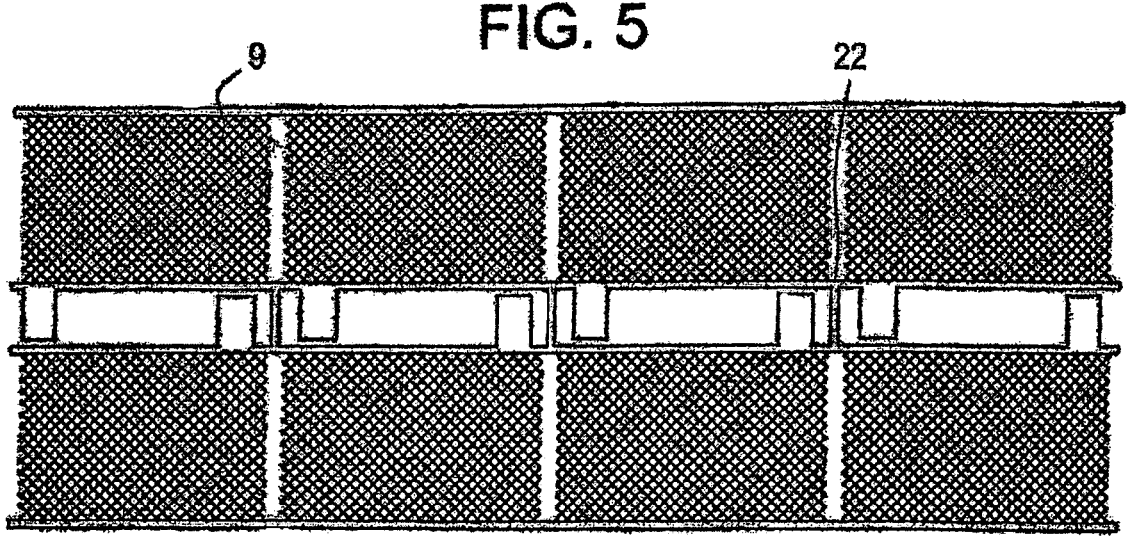
FIG. 5, like FIG. 2, is a top plan view of two joined elongated webs of grid cores.
Figure 6:
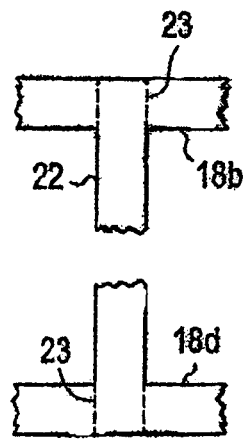
FIG. 6 is a top plan view, greatly enlarged, of the grid core wings and a cross-member.

In addition, as shown in FIGS. 3 and 5, when two webs are processed together, they are held together by cross-members 22. The cross-members 22 are removed along the sever lines 23, when the grids are separated, after they are cleaned and coated, The copper and titanium grid cores may be lead coated. A thin coating of lead over-coating may be used, less than 200 microns thick. The lead is coated by a hot melt process and not by electroplating. Preferably the titanium grids are electroplated or PVC plated with a thin (1-10) microns thick layer of silver, or less preferably nickel, underneath the lead. by progressing the web, before lead coating, through a silver/nickel electroplating bath or PVC chamber.

The hot melt process is less expensive and faster than electroplating. It is believed that a hot dip lead coating is more dense and less prone to pinholes compared to electroplating. The prior art shows hot lead coating of various products but not of copper or titanium battery grids; see U.S. Pat. Nos. 3,941,906 and 4,097,625. In this hot dip process the grids are expanded and stamped, as shown in FIG. 1 to form a web which is then lead coated. The grids are cut from the web after being lead coated. The copper and titanium grids are preferably coated with pure lead in a hot air solder leveler using heated air knives. Preferably the coating, on each side is 50-300 microns thick and more preferably 125-175 microns. The grid cores are not electroplated with lead.

In theory, the batteries of the present invention should have a longer life and take a greater number of charging/discharging cycles than conventional lead acid batteries. It is believed that lifetime, and the limitation on the number of charging/discharging cycles, relates to expansion and contraction of the grids with temperature changes and the growth of lead fingers. The grids of the present invention change their size less with temperature changes because: 1. the grids and grid cores are thinner than conventional lead grids, and 2. the grid cores of titanium or copper have a lower coefficient of temperature expansion than lead.

The battery grid paste, the pasting process and the grid curing process may be the same as with conventional auto battery manufacturing.

In accordance with the present invention, there is provided a lead-acid battery having a plurality of positive and negative battery grids, the polarity of the grids is determined by charging the battery after the grids are pasted and the battery assembled. At least some of the positive grids are lead coated titanium core grids having an expanded metal body portion. For starter batteries etc. they have a thickness of less than 0.7 mm.

The titanium grid is formed from a titanium alloy containing a platinum group metal in the amount of 0.001 to 0.9 of the alloy. The term "platinum group metal" means platinum, palladium, osmium, rhodium, and ruthenium. Preferably the platinum group metal in the alloy is less than 0.9% selected from the group of palladium, ruthenium or palladium and ruthenium. Most preferably the metal is palladium in less than 0.25% of the alloy, for example 0.2%. Grades 7, 11, & 16-18 of titanium alloy have 0.12-0.25% palladium, grades 16-18, 20 & 24 have 0.04-0.08% palladium ("lean palladium") and grades 13-15 & 26 & 27 contain 0.04-0.0.08% ruthenium. The alloy may also contain molybdenum 5-20% for corrosion protection.

US Patents relating to titanium alloys containing palladium and molybdenum include U.S. Pat. Nos. 6,334,913; 4,666,666 and 5,238,647. Titanium corrosion may be inhibited by surfactants, such as "tween" and other detergent chemicals.

Various embodiments use a plurality of negative copper core expanded metal body battery grids, each negative grid being a self supporting grid.

The term titanium core includes grids of titanium alloy and the term copper core includes grid cores of copper alloy. A preferred negative grid is composed of copper or copper alloy ("copper grid) the preferred alloy including at least 80% copper is "cupro-nickel" (UNS 70600) cu 90% and ni 10%.

The battery of the present invention, like the conventional lead-acid battery, is a multi-cell structure. Each cell comprises a set of vertical positive and negative flat plates formed of grids containing layers of electrochemically active pastes. The paste on the positive plate when charged comprises lead dioxide, which is the positive acting material. A non-conductive separator and an acid electrolyte, based on sulfuric acid, is interposed between the positive and negative plates.

However, unlike conventional lead acid batteries:
1. the grids have an expanded metal core of titanium alloy and the cores, for starter batteries, are thin, less than 0.7 mm in thickness and preferably less than 0.5 mm. In contrast, a lead grid is usually 1.3 to 3.0 mm thick; 2. the grids are not of lead but may be coated with lead; 3. the positive grids are of a titanium alloy containing a platinum group metal, preferably with less than 0.9% palladium or ruthenium; 4. the negative grids preferably have copper cores and they are coated with hot melt lead (not electroplated lead).

What is claimed is:

1. A lead-acid battery comprising a case, a plurality of cells in the case and a plurality of positive and negative interleaved battery grids with a separator therebetween within each cell; (a) at least some of said positive grids having titanium cores; (b) said titanium cores each having an expanded metal body portion and being a titanium alloy containing from 0.01 to 0.9% of a platinum group metal; (c) said titanium cores each having a flash coating of 0.5 to 10 microns of silver; and (d) said titanium cores each having a lead coating over the silver coating, which is a hot melt lead coating and not an electroplated coating.

2. A lead-acid battery as in claim 1, wherein said titanium core grids have a thickness, including the lead coating, of less than 0.9 mm.

3. A lead-acid battery as in claim 1 wherein the titanium cores are of a titanium alloy containing 0.2% to 0.02% selected from the group of palladium, ruthenium and palladium combined with ruthenium.

4. A lead-acid battery as in claim 1 wherein:
(a) at least some of said negative grids are hot melt lead coated copper core grids; (b) said copper core grids having an expanded metal body portions and (c) the cores of the copper core grids having a thickness of less than 0.8 mm.

5. A lead-acid battery as in claim 1 wherein the thickness of the titanium core before any coatings are applied thereon is less than 0.4 mm.

6. A lead-acid battery as in claim 1 wherein the titanium core comprises a titanium alloy containing 5% to 20% of molybdenum said molybdenum being present with said platinum group metal in the same titanium alloy.

7. A deep discharge lead-acid battery comprising a case, a plurality of cells in the case and a plurality of positive and negative interleaved battery grids with separators therebetween within each cell; (a) at least some of said positive grids having titanium cores; (b) said titanium cores each having an expanded metal body portion and being a titanium alloy containing from 0.01 to 0.9% of a platinum group metal; (c) said titanium cores each having a flash coating of 0.5 to 10 microns of silver; (d) said titanium cores each having a lead coating over the silver coating, which is a hot melt lead coating and not an electroplated coating; (e) said titanium core grids having a thickness, including the lead coating, of more than 0.5 mm and less than 2.0 mm.

8. A lead-acid battery as in claim 7 wherein the titanium cores are of titanium alloy containing 0.2% to 0.02% selected from the group of palladium, ruthenium and palladium combined with ruthenium.

9. A lead-acid battery as in claim 7 wherein:
(a) at least some of said negative grids being hot melt lead coated copper core grids; (c) said copper core grids having an expanded metal body portions and the cores of the copper core grids having a thickness of more than 0.5 mm and less than 2.0 mm.

10. A lead-acid battery as in claim 7 wherein the titanium core comprises a titanium alloy containing 5% to 20% of molybdenum said molybdenum being present with said platinum group metal in the same titanium alloy.

11. A method of making a lead-acid battery having a plurality of composite positive battery grids, said grids having a thin titanium core of less than 2.0 mm thickness, which core has front and back faces; said core having a body portion of expanded titanium, an unexpanded bar portion at the top of the body portion, a lug connected to the top bar portion, the top bar portion having two opposed wing portions which extend beyond the body portion, the opposed sides of the body portion being expanded; the method including the steps, in sequence, of:
  (a) expanding a coil of titanium having a thickness of less than 2.0 mm to form a web comprising a series of joined grids, the grids being connected by the wing portions of the grids;
  (b) progressing the web through cleaning tanks and through at least one electroplating tank and electrocoating the titanium grids with a flash coating 1-20 microns thick selected from the group of silver and nickel; (c) cutting the web into individual grids by severing the wing portions; and (d) forming the grids into a lead-acid battery having negative grids and with a separator between each negative and positive grid.

12. A method as in claim 11 and, before severing the grid wings, progressing the web, into a hot melt lead tank and coating the grids with lead having a thickness of less than 200 microns on each of said sides.

13. A method as in claim 11 wherein the titanium grids each have a unexpanded lower bar portion connected to the lower edge of the body portion and the lower bar portion having extending wing portions which extend in opposite directions beyond the body portion and which are connected to another pair of extending wing portions of a bottom bar portion of an adjoining grid of the web.

14. As an intermediate product in the production of lead acid storage batteries:
  (a) a web of joined composite positive battery grids, said grids each having a thin titanium core of less than 2.0 mm thickness, which core has front and back faces and a bottom edge; (b) said core having a body portion of expanded titanium, an unexpanded bar portion at the top of the body portion, a lug connected to the bar portion, the top bar portion having two opposed wing portions which extend beyond the body portion, the body portion having two opposite sides, the opposed sides of the body portion being expanded and not unexpanded bars; (c) a gap between adjacent body portions of said joined grids so that the sides of the body portions are not joined to the body portions of adjacent grids and are exposed to subsequent treatments; (d) the wing portions extending across the gap with the wing portions of one grid being joined to the wing portions of adjacent grids of the web and being adapted to be severed to form separated grids.

15. The intermediate product of claim 14 wherein: the titanium grids each have a unexpanded bottom bar portion connected to the lower edge of the body portion, the bottom bar portion having extending wing portions which extend in opposite directions beyond the body portion and which are connected to another pair of extending wing portions of a bottom bar portion of an adjacent grid of the web.

* * * * *